(12) United States Patent
Tanaka

(10) Patent No.: US 11,794,523 B2
(45) Date of Patent: Oct. 24, 2023

(54) PNEUMATIC TIRE

(71) Applicant: SUMITOMO RUBBER INDUSTRIES, LTD., Hyogo (JP)

(72) Inventor: Tatsuhiro Tanaka, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 69 days.

(21) Appl. No.: 17/719,538

(22) Filed: Apr. 13, 2022

(65) Prior Publication Data

US 2022/0250412 A1   Aug. 11, 2022

Related U.S. Application Data

(63) Continuation-in-part of application No. PCT/JP2020/038806, filed on Oct. 14, 2020.

(30) Foreign Application Priority Data

Oct. 16, 2019   (JP) ................. 2019-189446

(51) Int. Cl.
*B60C 1/00*   (2006.01)
*C08L 9/06*   (2006.01)

(52) U.S. Cl.
CPC .............. *B60C 1/0016* (2013.01); *C08L 9/06* (2013.01); *B60C 2200/04* (2013.01); *C08L 2205/035* (2013.01)

(58) Field of Classification Search
CPC ...... B60C 1/0016; B60C 2200/04; C08L 9/06
See application file for complete search history.

(56) References Cited

U.S. PATENT DOCUMENTS

| | | | |
|---|---|---|---|
| 5,343,919 A | 9/1994 | Yoshida | |
| 2008/0142142 A1 | 6/2008 | Agostini et al. | |
| 2010/0122761 A1* | 5/2010 | Miyake | B60C 9/2006 152/454 |
| 2010/0256258 A1* | 10/2010 | Miyazaki | B60C 1/0016 523/150 |
| 2013/0123418 A1 | 5/2013 | Araujo Da Silva et al. | |
| 2013/0172443 A1* | 7/2013 | Kushida | C08K 3/36 523/156 |
| 2015/0136296 A1 | 5/2015 | Kotoku et al. | |
| 2016/0152792 A1 | 6/2016 | Kunisawa et al. | |
| 2016/0280007 A1 | 9/2016 | Cato et al. | |
| 2018/0222255 A1 | 8/2018 | Maehara | |
| 2018/0250985 A1 | 9/2018 | Maekawa et al. | |
| 2018/0273724 A1 | 9/2018 | Miyazaki | |
| 2019/0062531 A1 | 2/2019 | Pille-Wolf et al. | |

FOREIGN PATENT DOCUMENTS

| | | |
|---|---|---|
| CN | 101306635 A | 11/2008 |
| CN | 104379367 A | 2/2015 |
| CN | 105646976 A | 6/2016 |
| EP | 3 495 416 | 6/2019 |
| GB | 2 224 703 | 5/1990 |
| JP | 2009-120819 | 6/2009 |
| JP | 2015-145142 | 8/2015 |
| JP | 2017-75227 | 4/2017 |
| JP | 2018-127199 | 8/2018 |
| JP | 2019-44154 | 3/2019 |
| JP | 2019-93860 | 6/2019 |
| JP | 2019-104772 | 6/2019 |
| NZ | 215320 | 2/1987 |

OTHER PUBLICATIONS

Office Action issued in Chinese Patent Application No. 202080026782.X dated Nov. 18, 2022.
International Search Report issued in International Patent Application No. PCT/JP2020/038806, dated Dec. 22, 2020, along with an English translation thereof.
International Preliminary Report on Patentability issued in International Patent Application No. PCT/JP2020/038806, dated Jun. 14, 2021, along with an English translation thereof.
Extended European Search Report issued in EP Patent Application No. 20877191, dated Feb. 23, 2022.

* cited by examiner

*Primary Examiner* — Doris L Lee
(74) *Attorney, Agent, or Firm* — GREENBLUM & BERNSTEIN, P.L.C.

(57) ABSTRACT

A tire in which an elongation at break and/or compounding of a rubber composition of a tread.

14 Claims, 1 Drawing Sheet

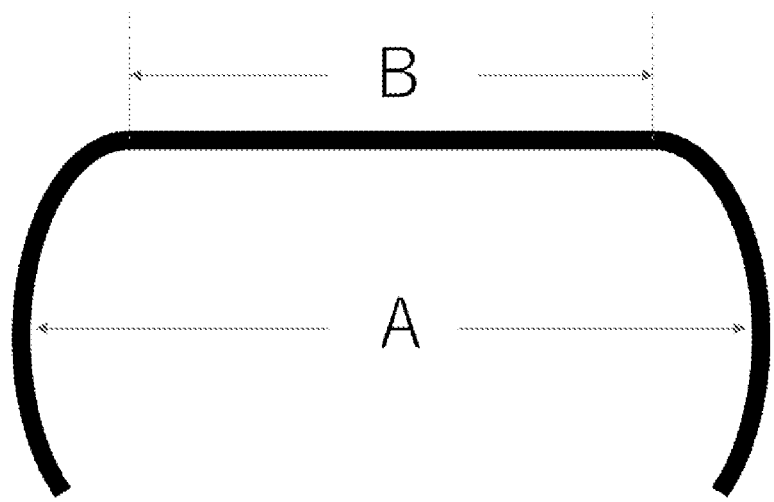

PNEUMATIC TIRE

CROSS REFERENCE TO RELATED APPLICATIONS

This application is a continuation-in-part of PCT International Application No. PCT/JP2020/038806, filed on Oct. 14, 2020, which claims priority under 35 U.S.C. 119(a) to Patent Application No. 2019-189446, filed in Japan on Oct. 16, 2019, all of which are hereby expressly incorporated by reference into the present application.

TECHNICAL FIELD

The present disclosure relates to a pneumatic tire having improved uneven abrasion resistance during high-speed running.

BACKGROUND OF THE INVENTION

There has been a growing demand for achieving fuel efficiency, wet grip performance, steering stability during high-speed running, and the like, as performances of a tire for a passenger car, at a high level.

In Patent Document 1, for the purpose of improving fuel efficiency and the like, use of a silane coupling agent having a mercapto group with a high reactivity (a mercapto-based silane coupling agent) together with silica has been considered. However, in the mercapto-based silane coupling agent, good fuel efficiency, wet grip performance, and abrasion resistance can be obtained, while processability tends to deteriorate, and there is room for improvement in silica dispersibility.

Moreover, a tire for a passenger car aimed at fuel efficiency has a problem that uneven abrasion due to a temperature rise on a tread surface of a shoulder head part easily occurs.

Patent Document 1: JP 2009-120819 A

SUMMARY OF THE INVENTION

It is an object of the present disclosure to provide a pneumatic tire having improved uneven abrasion resistance during high-speed running.

As a result of intensive studies, the present inventor has found that, in a tire in which a total width of a tire and a breaker width of the tire satisfy predetermined requirements (preferably a tire for a passenger car), by making an elongation at break and/or compounding of a rubber composition of a tread to have specific conditions, the uneven abrasion resistance during high-speed running can be improved. Furthermore, in a preferred embodiment, the present inventor has found that even fuel efficiency, wet grip performance, and steering stability at high-speed running are improved with good balance, and completed the present disclosure.

That is, the present disclosure relates to:

A pneumatic tire having a flattening ratio of 35 to 70%, wherein, when Y is defined by the following formula:

$$Y = (B - 16)/A$$

where A (mm) is a total width of the tire and B (mm) is a breaker width of the tire when a tread of the tire, the tire being rim-assembled on a normal rim and being in a normal state with a normal internal pressure and no load, is pressed against a flat surface with a normal load being applied, a range of the value of Y changes according to the flattening ratio as follows:

when the flattening ratio is 35% or more and less than 40%, Y is 0.80 or less,
when the flattening ratio is 40% or more and less than 45%, Y is 0.79 or less,
when the flattening is 45% or more and less than 50%, Y is 0.78 or less,
when the flattening ratio is 50% or more and less than 55%, Y is 0.77 or less,
when the flattening ratio is 55% or more and less than 60%, Y is 0.75 or less,
when the flattening ratio is 60% or more and less than 65%, Y is 0.72 or less,
when the flattening ratio is 65% or more and less than 70%, Y is 0.69 or less,
when the flattening ratio is 70%, Y is 0.67 or less, and
wherein an elongation at break of a rubber composition of the tread measured under the following test condition is 180% or more:
(Test Condition)
Tensile rate: 14.0 m/sec
Temperature: 100° C.
Test piece: Dumbbell-shaped No. 7.

The pneumatic tire of the present disclosure, in which the total width of the tire and the breaker width of the tire satisfy predetermined requirements and the elongation at break and/or compounding of the rubber composition of the tread is made to have specific conditions, is excellent in uneven abrasion resistance during high-speed running. Moreover, in a preferred embodiment, fuel efficiency, wet grip performance, and steering stability during high-speed running are improved with good balance.

BRIEF DESCRIPTION OF THE DRAWINGS

FIG. 1 is a schematic view of a cut section of a tire when a tread is pressed against a flat surface.

DETAILED DESCRIPTION

The first embodiment of the present disclosure is a pneumatic tire having a flattening ratio of 35 to 70%, wherein, when Y is defined by the following formula:

$$Y = (B - 16)/A$$

where A (mm) is a total width of the tire and B (mm) is a breaker width of the tire when a tread of the tire, the tire being rim-assembled on a normal rim and being in a normal state with a normal internal pressure and no load, is pressed against a flat surface with a normal load being applied, a range of the value of Y changes according to the flattening ratio as follows:

when the flattening ratio is 35% or more and less than 40%, Y is 0.80 or less (preferably 0.79 or less, more preferably 0.78 or less), when the flattening ratio is 40% or more and less than 45%, Y is 0.79 or less (preferably 0.78 or less, more preferably 0.77 or less), when the flattening is 45% or more and less than 50%, Y is 0.78 or less (preferably 0.77 or less, more preferably 0.76 or less), when the flattening ratio is 50% or more and less than 55%, Y is 0.77 or less (preferably 0.76 or less, more preferably 0.75 or less), when the flattening ratio is 55% or more and less than 60%, Y is 0.75 or less (preferably 0.74 or less, more preferably 0.73 or less), when the flattening ratio is 60% or more and less than 65%, Y is 0.72 or less (preferably 0.71 or less, more preferably 0.70 or less), when the flattening ratio is 65% or more and less than 70%, Y is 0.69 or less (preferably 0.68 or less, more preferably 0.67 or less), when the flattening ratio is 70%, Y is 0.67 or less (preferably 0.66 or less, more preferably 0.65 or less), and wherein an elongation at break of a rubber composition of the tread measured under the following test condition is 180% or more:

(Test Condition)
Tensile rate: 14.0 m/sec
Temperature: 100° C.
Test piece: Dumbbell-shaped No. 7

The JIS standard defines that a tensile rate when measuring an elongation at break (elongation at the time of cutting) is 500±50 mm/min for test pieces of dumbbell-shaped No. 1, No. 2, No. 3, No. 5, and No. 6, and 200±20 mm/min for test pieces of dumbbell-shaped No. 7 and No. 8. As a result of intensive studies on this tensile rate, it was found that an elongation at break measured at an extremely high tensile rate of 14.0 m/sec in an atmosphere at 100° C. (hereinafter, also referred to as a fast high temperature EB) strongly correlates with uneven abrasion resistance during high-speed running, and a good uneven abrasion resistance can be secured as long as the fast high temperature EB is within a specific range.

The second embodiment of the present disclosure is a pneumatic tire having a flattening ratio of 35 to 70%, wherein, when Y is defined by the following formula:

$$Y = (B - 16)/A$$

where A (mm) is a total width of the tire and B (mm) is a breaker width of the tire when a tread of the tire, the tire being rim-assembled on a normal rim and being in a normal state with a normal internal pressure and no load, is pressed against a flat surface with a normal load being applied, a range of the value of Y changes according to the flattening ratio as follows:

when the flattening ratio is 35% or more and less than 40%, Y is 0.80 or less (preferably 0.79 or less, more preferably 0.78 or less), when the flattening ratio is 40% or more and less than 45%, Y is 0.79 or less (preferably 0.78 or less, more preferably 0.77 or less), when the flattening is 45% or more and less than 50%, Y is 0.78 or less (preferably 0.77 or less, more preferably 0.76 or less), when the flattening ratio is 50% or more and less than 55%, Y is 0.77 or less (preferably 0.76 or less, more preferably 0.75 or less), when the flattening ratio is 55% or more and less than 60%, Y is 0.75 or less (preferably 0.74 or less, more preferably 0.73 or less), when the flattening ratio is 60% or more and less than 65%, Y is 0.72 or less (preferably 0.71 or less, more preferably 0.70 or less), when the flattening ratio is 65% or more and less than 70%, Y is 0.69 or less (preferably 0.68 or less, more preferably 0.67 or less), when the flattening ratio is 70%, Y is 0.67 or less (preferably 0.66 or less, more preferably 0.65 or less), wherein a rubber composition of the tread comprises a rubber component comprising a styrene-butadiene rubber, silica, and a silane coupling agent having a mercapto group, wherein a total styrene content in the styrene-butadiene rubber and a butadiene rubber is 25% by mass or more, and wherein, when a content of silica based on 100 parts by mass of the rubber component is C (part(s) by mass) and an average primary particle size of silica is D (nm), C/D is 3.8 or higher.

In the production of the rubber composition of the tread (rubber composition for tread), by using a rubber component comprising styrene-butadiene rubber, and silica and a silane coupling agent which satisfy predetermined requirements in combination, deterioration of processability during kneading can be overcome, silica dispersibility in the rubber component can be secured, and the fast high temperature EB can be improved. Moreover, by adopting such compounding, the balance of fuel efficiency, wet grip performance, and uneven abrasion resistance can also be improved.

The third embodiment of the present disclosure is a pneumatic tire having a flattening ratio of 35 to 70%, wherein, when Y is defined by the following formula:

$$Y = (B - 16)/A$$

where A (mm) is a total width of the tire and B (mm) is a breaker width of the tire when a tread of the tire, the tire being rim-assembled on a normal rim and being in a normal state with a normal internal pressure and no load, is pressed against a flat surface with a normal load being applied, a range of the value of Y changes according to the flattening ratio as follows:

when the flattening ratio is 35% or more and less than 40%, Y is 0.80 or less (preferably 0.79 or less, more preferably 0.78 or less), when the flattening ratio is 40% or more and less than 45%, Y is 0.79 or less (preferably 0.78 or less, more preferably 0.77 or less), when the flattening is 45% or more and less than 50%, Y is 0.78 or less (preferably 0.77 or less, more preferably 0.76 or less), when the flattening ratio is 50% or more and less than 55%, Y is 0.77 or less (preferably 0.76 or less, more preferably 0.75 or less), when the flattening ratio is 55% or more and less than 60%, Y is 0.75 or less (preferably 0.74 or less, more preferably 0.73 or less), when the flattening ratio is 60% or more and less than 65%, Y is 0.72 or less (preferably 0.71 or less, more preferably 0.70 or less), when the flattening ratio is 65% or more and less than 70%, Y is 0.69 or less (preferably 0.68 or less, more preferably 0.67 or less), when the flattening ratio is 70%, Y is 0.67 or less (preferably 0.66 or less, more preferably 0.65 or less), wherein a rubber composition of the tread comprises a rubber component comprising a styrene-butadiene rubber, silica, and a silane coupling agent having a mercapto group, wherein a total styrene content in the styrene-butadiene rubber and a butadiene rubber is 25% by mass or more, and wherein, when a content of silica based on 100 parts by mass of the rubber component is C (part(s) by mass) and an average primary particle size of silica is D (nm), C/D is 3.8 or higher; or wherein an elongation at break of the rubber composition of the tread measured under the following test condition is 180% or more:

(Test Condition)
Tensile rate: 14.0 m/sec
Temperature: 100° C.
Test pieces: Dumbbell-shaped No. 7

A procedure for manufacturing a pneumatic tire including the production of the rubber composition for tread that is one embodiment of the present disclosure will be described in detail below. However, the following to descriptions are illustrative for explaining the present disclosure, and are not intended to limit the technical scope of the present disclosure to this description range only. Besides, in the present specification, a numerical range identified with "to" means to include the numerical values of both ends.

<Rubber Component>

In the present disclosure, a styrene-butadiene rubber (SBR) and a butadiene rubber (BR) are appropriately used as rubber components which are to be used in the production of the rubber composition for tread. As a rubber component, it is preferable to comprise at least one selected from the group consisting of a SBR and a BR, and it is more preferable to comprise a SBR. The rubber component may be a rubber component comprising a SBR and a BR, or may be a rubber component consisting only of a SBR and a BR.

(SBR)

The SBR is not particularly limited, examples of which include a solution-polymerized SBR (S-SBR), an emulsion-polymerized SBR (E-SBR), modified SBRs (a modified S-SBR, a modified E-SBR) thereof, and the like. Examples of the modified SBR include a SBR modified at its terminal and/or main chain, a modified SBR coupled with tin, a silicon compound, etc. (a modified SBR of condensate or having a branched structure, etc.), and the like. Among them, a S—SBR and a modified SBR are preferable, and a modified S-SBR is more preferable. Furthermore, hydrogenated ones of these SBRs (hydrogenated SBRs) and the like can also be used. These SBRs may be used alone, or two or more thereof may be used in combination.

Examples of the S-SBR that can be used in the present disclosure include S-SBRs manufactured and sold by JSR Corporation, Sumitomo Chemical Co., Ltd., Ube Industries, Ltd., Asahi Kasei Corporation, ZS Elastomer Co., Ltd., etc.

A styrene content of the SBR is preferably 10% by mass or more, more preferably 15% by mass or more, further preferably 20% by mass or more, from the viewpoint of grip performance. On the other hand, the styrene content of the SBR is preferably 55% by mass or less, more preferably 50% by mass or less, further preferably 45% by mass or less. When the styrene content of the SBR exceeds 55% by mass, styrene groups become adjacent to each other, a polymer becomes too hard, and cross-linking easily becomes non-uniform, which may deteriorate blow performance during high-temperature running, and temperature dependency increases, and a change in performance with respect to a temperature change becomes large, which leads to a tendency that a stable grip performance during running and in the latter stage thereof cannot be obtained satisfactorily. Besides, in the present specification, the styrene content of the SBR is calculated by $^1$H-NMR measurement.

A vinyl bonding amount of the SBR is preferably 10 mol % or more, more preferably 15 mol % or more, further preferably 20 mol % or more, from the viewpoints of ensuring reactivity with silica, rubber strength, and abrasion resistance. Moreover, the vinyl bonding amount of the SBR is preferably 70 mol % or less, more preferably 65 mol % or less, further preferably 60 mol % or less, from the viewpoints of prevention of increase in temperature dependence, wet grip performance, elongation at break, and abrasion resistance. Besides, in the present specification, the vinyl bonding amount of the SBR (1,2-bond butadiene unit amount) is measured by infrared absorption spectrometry.

A weight-average molecular weight (Mw) of the SBR is preferably 200,000 or more, more preferably 300,000 or more, further preferably 400,000 or more, particularly preferably 500,000 or more, from the viewpoints of wet grip performance and abrasion resistance. Moreover, the Mw is preferably 2,000,000 or less, more preferably 1,500,000 or less, further preferably 1,000,000 or less, from the viewpoints of cross-linking uniformity and the like. Besides, the Mw can be calculated in terms of a standard polystyrene based on measurement values obtained by a gel permeation chromatography (GPC) (e.g., GPC-8000 Series manufactured by Tosoh Corporation, detector: differential refractometer, column: TSKGEL SUPERMULTIPORE HZ-M manufactured by Tosoh Corporation).

A content of the SBR in the rubber component is preferably 60% by mass or more, more preferably 65% by mass or more, further preferably 70% by mass or more, particularly preferably 75% by mass or more, from the viewpoint of wet grip performance. Moreover, it is preferably 95% by mass or less, more preferably 90% by mass or less, further preferably 85% by mass or less, from the viewpoint of abrasion resistance.

(BR)

The BR is not particularly limited, and those common in the tire industry can be used such as, for example, a BR having a cis 1,4 bond content of less than 50% (a low cis BR), a BR having a cis 1,4 bond content of 90% or more (a high cis BR), a rare-earth-based butadiene rubber synthesized using a rare-earth element-based catalyst (a rare-earth-based BR), a BR containing a syndiotactic polybutadiene crystal (a SPB-containing BR), and a modified BR (a high cis modified BR, a low cis modified BR).

Examples of the high cis BR include, for example, BR1220 manufactured by Zeon Corporation, BR130B, BR150B, BR150L manufactured by Ube Industries, Ltd., BR730 manufactured by JSR Corporation, and the like. When the high cis BR is compounded, low temperature characteristics and abrasion resistance can be improved. Examples of the rare-earth-based BR include, for example, BUNA-CB25 manufactured by LANXESS, and the like.

Examples of the SPB-containing BR include those in which 1,2-syndiotactic polybutadiene crystal is chemically bonded with BR and dispersed, but not those in which the crystal is simply dispersed in the BR. Examples of such SPB-containing BR include VCR-303, VCR-412, VCR-617 manufactured by Ube Industries, Ltd, and the like.

Examples of modified BRs include those obtained by adding a tin compound after polymerizing 1,3-butadiene by a lithium initiator, the end of which is further bonded by tin-carbon bond (a tin-modified BR), a butadiene rubber having a condensed alkoxysilane compound at its active end, and the like. Examples of such modified BRs include, for example, BR1250H (tin-modified) manufactured by ZS Elastomer Co., Ltd., an S-modified polymer (modified for silica), and the like.

A weight-average molecular weight (Mw) of the BR is preferably 300,000 or more, more preferably 350,000 or more, further preferably 400,000 or more, from the viewpoints of abrasion resistance and grip performance, etc. Moreover, it is preferably 2,000,000 or less, more preferably 1,000,000 or less, from the viewpoints of cross-linking uniformity, etc. Besides, the Mw can be calculated in terms of a standard polystyrene based on measurement values obtained by a gel permeation chromatography (GPC) (e.g., GPC-8000 Series manufactured by Tosoh Corporation, detector: differential refractometer, column: TSKGEL SUPERMULTIPORE HZ-M manufactured by Tosoh Corporation).

A content of the BR in the rubber component is preferably 5% by mass or more, more preferably 10% by mass or more, further preferably 15% by mass or more, from the viewpoint of abrasion resistance. Moreover, it is preferably 40% by mass or less, more preferably 35% by mass or less, further preferably 30% by mass or less, particularly preferably 25% by mass or less, from the viewpoint of wet grip performance.

A total content of the SBR and BR in the rubber component is preferably 70% by mass or more, more preferably 80% by mass or more, further preferably 80% by mass or more, particularly preferably 85% by mass or more.

(Other Rubber Components)

As the rubber components according to the present disclosure, rubber components other than the above-described SBRs and BRs may be compounded. As other rubber components, cross-linkable rubber components commonly used in the rubber industry can be used, such as, for example, an isoprene-based rubber, a styrene-isoprene-butadiene copolymer rubber (SIBR), a styrene-isobutylene-styrene block copolymer (SIBS), a chloroprene rubber (CR), an acrylonitrile-butadiene rubber (NBR), a hydrogenated nitrile rubber (HNBR), a butyl rubber (IIR), an ethylene propylene rubber, a polynorbornene rubber, a silicone rubber, a polyethylene chloride rubber, a fluororubber (FKM), an acrylic rubber (ACM), a hydrin rubber, and the like. These other rubber components may be used alone, or two or more thereof may be used in combination.

As an isoprene-based rubber, for example, those common in the tire industry can be used, such as an isoprene rubber (IR) and a natural rubber. Examples of the natural rubber includes a non-modified natural rubber (NR), as well as a modified natural rubber such as an epoxidized natural rubber (ENR), a hydrogenated natural rubber (HNR), a deproteinized natural rubber (DPNR), an ultrapure natural rubber (UPNR), and a grafted natural rubber, and the like. These rubbers may be used alone, or two or more thereof may be used in combination.

The NR is not particularly limited, and those common in the tire industry can be used, examples of which include, for example, SIR20, RSS#3, TSR20, and the like.

In the present specification, a "total styrene content in a styrene-butadiene rubber and a butadiene rubber" means a value obtained by multiplying a styrene content of the SBR by a content of the SBR with respect to a total content of the SBR and BR (SBR/(SBR+BR)). In the rubber component according to the present disclosure, the wet grip performance can be improved by setting a total styrene content in a styrene-butadiene rubber and a butadiene rubber to 25% by mass or more, preferably 26.5% by mass or more, more preferably 28% by mass or more, further preferably 30% by mass or more, particularly preferably 32% by mass or more. On the other hand, the total styrene content in the styrene-butadiene rubber and butadiene rubber is preferably 55% by mass or less, more preferably 50% by mass or less, further preferably 45% by mass or less.

(Carbon Black)

Carbon black is not particularly limited, and those common in the tire industry can be used such as GPF, FEF, HAF, ISAF, and SAF, and specifically, N110, N115, N120, N125, N134, N135, N219, N220, N231, N234, N293, N299, N326, N330, N339, N343, N347, N351, N356, N358, N375, N539, N550, N582, N630, N642, N650, N660, N683, N754, N762, N765, N772, N774, N787, N907, N908, N990, N991, and the like can be appropriately used, and in-house synthesized products and the like can also be appropriately used. They may be used alone, or two or more thereof may be used in combination.

A nitrogen adsorption specific surface area ($N_2SA$) of carbon black is preferably 50 $m^2/g$ or more, more preferably 80 $m^2/g$ or more, further preferably 100 $m^2/g$ or more, from the viewpoints of weather resistance and reinforcing property. Moreover, it is preferably 250 $m^2/g$ or less, more preferably 220 $m^2/g$ or less, from the viewpoints of dispersibility, fuel efficiency, fracture characteristics, and durability. Besides, the $N_2SA$ of carbon black in the present specification is a value measured according to JIS K 6217-2: 2017 "Carbon black for rubber industry-Fundamental characteristics-Part 2: Determination of specific surface area-Nitrogen adsorption methods-Single-point procedures" A Method.

A content of carbon black when compounded based on 100 parts by mass of the rubber component is preferably 1 part by mass or more, more preferably 3 parts by mass or more, further preferably 5 parts by mass or more, from the viewpoints of weather resistance and reinforcing property. Moreover, it is preferably 40 parts by mass or less, more preferably 30 parts by mass or less, further preferably 20 parts by mass or less, from the viewpoint of fuel efficiency.

(Silica)

When the rubber composition for tread according to the present disclosure comprises silica, fuel efficiency, abrasion resistance, and wet grip performance can be improved. Silica is not particularly limited, and those common in the tire industry can be used, such as, for example, silica prepared by a dry process (anhydrous silica) and silica prepared by a wet process (hydrous silica). Among them, hydrous silica prepared by a wet process is preferable from the reason that it has many silanol groups. Silica may be used alone, or two or more thereof may be used in combination.

A nitrogen adsorption specific surface area ($N_2SA$) of silica is preferably 150 $m^2/g$ or more, more preferably 180 $m^2/g$ or more, further preferably 200 $m^2/g$ or more, from the viewpoint of elongation at break. Moreover, it is preferably 300 $m^2/g$ or less, more preferably 250 $m^2/g$ or less, from the viewpoints of fuel efficiency and processability. Besides, a BET specific surface area of silica in the present specification is a value measured by a BET method according to ASTM D3037-93.

An average primary particle size of silica is preferably 20 nm or less, more preferably 19 nm or less, more preferably 18 nm or less, more preferably 17 nm or less, more preferably 16 nm or less, more preferably 15 nm or less, more preferably 14 nm or less, further preferably 12 nm or less. A lower limit of the average primary particle size is, but not particularly limited to, preferably 1 nm or more, more preferably 3 nm or more, further preferably 5 nm or more. When the average primary particle size of silica is within the above-described ranges, silica dispersibility can be more improved, and reinforcing property, fracture characteristics, and abrasion resistance can be further improved. Besides, the average primary particle size of silica can be calculated by observing silica with a transmission or scanning electron microscope, measuring 400 or more primary particles of silica observed in the field of view, and averaging them.

When a content of silica based on 100 parts by mass of the rubber component is C (part(s) by mass) and an average primary particle size of silica is D (nm), C/D is preferably 3.8 or higher. When C/D is 3.8 or higher, uneven abrasion resistance can be improved. It is more preferably 4.0 or more, more preferably 4.3 or more, more preferably 4.5 or more, more preferably 4.6 or more, more preferably 4.8 or more, more preferably 5.0 or more, further preferably 5.2 or more, particularly preferably 5.3 or more. On the other hand, an upper limit of C/D may, but not particularly limited to, be, for example, 20 or lower, 15 or lower, 12 or lower, 10 or lower, or 8.0 or lower.

A content of silica when compounded based on 100 parts by mass of the rubber component is preferably 50 parts by mass or more, preferably 55 parts by mass or more, further preferably 60 parts by mass or more, from the viewpoints of fuel efficiency, wet grip performance, and abrasion resistance. Moreover, it is preferably 150 parts by mass or less, preferably 120 parts by mass or less, further preferably 100 parts by mass or less, from the viewpoint of suppressing deterioration of fuel efficiency and abrasion resistance due to deterioration of silica dispersibility in a rubber.

(Other Reinforcing Fillers)

As reinforcing fillers other than carbon black and silica, those commonly used in the conventional tire industry can be compounded, such as aluminum hydroxide, calcium carbonate, alumina, clay, and talc.

(Silane Coupling Agent)

It is preferable that the silane coupling agent having a mercapto group is a compound represented by the following formula (3) and/or a compound comprising a bond unit A represented by the following formula (4) and a bond unit B represented by the following formula (5).

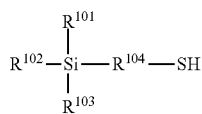

(3)

(wherein, $R^{101}$, $R^{102}$, and $R^{103}$ each independently represents a group represented by alkyl having 1 to 12 carbon atoms, alkoxy having 1 to 12 carbon atoms, or —O—$(R^{111}$—O$)_z$—$R^{112}$ ($R^{111}$s of z each independently represents a divalent hydrocarbon group having 1 to 30 carbon atoms; $R^{112}$ represents alkyl having 1 to 30 carbon atoms, alkenyl having 2 to 30 carbon atoms, aryl having 6 to 30 carbon atoms, or aralkyl having 7 to 30 carbon atoms; and z represents an integer of 1 to 30); and $R^{104}$ represents an alkylene having 1 to 6 carbon atoms.)

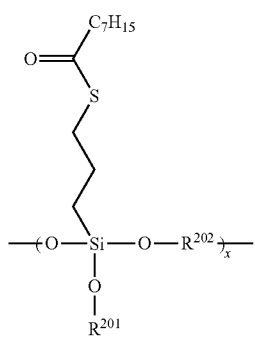

(4)

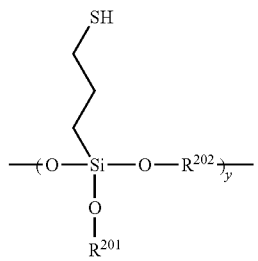

(5)

(wherein, x represents an integer of 0 or more; y represents an integer of 1 or more; $R^{201}$ represents alkyl having 1 to 30 carbon atoms, alkenyl having 2 to 30 carbon atoms, or alkynyl having 2 to 30 carbon atoms, which may be substituted with a hydrogen atom, a halogen atom, hydroxyl, or carboxyl; and $R^{202}$ represents alkylene having 1 to 30 carbon atoms, alkenylene having 2 to 30 carbon atoms, or alkynylene having 2 to 30 carbon atoms; where $R^{201}$ and $R^{202}$ may together form a ring structure.)

Examples of the compound represented by the formula (3) include, for example, 3-mercaptopropyltrimethoxysilane, 3-mercaptopropyltriethoxysilane, 2-mercaptoethyltrimethoxysilane, 2-mercaptoethyltriethoxysilane, a compound represented by the following formula (6) (Si363 manufactured by Evonik Degussa GmbH), and the like, and the compound represented by the following formula (6) can be appropriately used. They may be used alone, or two or more thereof may be used in combination.

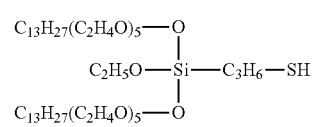

(6)

By using the compound comprising the bond unit A represented by the formula (4) and the bond unit B represented by the formula (5), an increase in viscosity during processing is suppressed as compared with a sulfide-based silane coupling agent such as bis-(3-triethoxysilylpropyl) tetrasulfide. Therefore, silica dispersibility becomes better, and fuel efficiency, wet grip performance, and elongation at break tend to be further improved. It is considered that this is because a sulfide part of the bond unit A is a C—S—C bond and thus is thermally stable as compared with tetrasulfide or disulfide, thereby resulting in a small increase in Mooney viscosity.

A content of the bond unit A is preferably 30 to 99 mol %, more preferably 50 to 90 mol %, from the viewpoint of suppressing an increase in viscosity during processing. Moreover, a content of the bond unit B is preferably 1 to 70 mol %, more preferably 5 to 65 mol %, further preferably 10 to 55 mol %. Furthermore, a total content of the bond units A and B is preferably 95 mol % or more, more preferably 98 mol % or more, particularly preferably 100 mol %. Besides, the content of the bond units A and B is an amount including the case where the bond units A and B are located at the terminal of the silane coupling agent. A form where the bond units A and B are located at the terminal of the silane coupling agent is not particularly limited, as long as it forms units corresponding to the formula (4) representing the bond unit A and the formula (5) representing the bond unit B.

In a compound comprising the bond unit A represented by the formula (4) and the bond unit B represented by the formula (5), a total number of repetitions (x+y) of the number of repetitions of the bond unit A (x) and the number of repetitions of the bond unit B (y) is preferably in a range of 3 to 300. Within this range, mercaptosilane of the bond unit B is covered with —$C_7H_{15}$ of the bond unit A, so that shortening of scorch time can be suppressed, and a good reactivity with silica and rubber components can be secured.

Examples of the compound comprising the bond unit A represented by the formula (4) and the bond unit B represented by the formula (5) include, for example, NXT-Z30, NXT-Z45, NXT-Z60, and NXT-Z100 manufactured by Momentive Performance Materials, and the like. They may be used alone, or two or more thereof may be used in combination.

A content of the silane coupling agent having a mercapto group is preferably 0.5 parts by mass or more, more preferably 1 part by mass or more, further preferably 2 parts by mass or more, particularly preferably 4 parts by mass or more, based on 100 parts by mass of silica, from the viewpoint of fuel efficiency. Moreover, it is preferably 20 parts by mass or less, more preferably 12 parts by mass or less, further preferably 10 parts by mass or less, particularly preferably 9 parts by mass or less, from the viewpoints of rubber strength and abrasion resistance.

In the present disclosure, the rubber composition may further comprise other silane coupling agents in addition to the above-described silane coupling agent having a mercapto group. Examples of other silane coupling agents include, for example, silane coupling agents having a sulfide group such as bis(3-triethoxysilylpropyl)disulfide and bis(3-triethoxysilylpropyl)tetrasulfide; silane coupling agents having a vinyl group such as vinyltriethoxysilane and vinyltrimethoxysilane; silane coupling agents having an amino group such as 3-aminopropyltriethoxysilane, 3-aminopropyltrimethoxysilane, and 3-(2-aminoethyl)aminopropyltriethoxysilane; glycidoxy-based silane coupling agents such as γ-glycidoxypropyltriethoxysilane and γ-glycidoxypropyltrimethoxysilane; nitro-based silane coupling agents such as 3-nitropropyltrimethoxysilane and 3-nitropropyltriethoxysilane; chloro-based silane coupling agents such as 3-chloropropyltrimethoxysilane and 3-chloropropyltriethoxy, and the like. These silane coupling agents may be used alone, or two or more thereof may be used in combination.

The rubber composition for tread according to the present disclosure preferably comprises zinc dithiophosphate represented by the following formula (7):

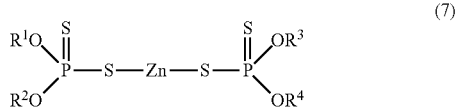

(7)

(wherein $R^1$, $R^2$, $R^3$, and $R^4$ each independently represents alkyl having 1 to 18 carbon atoms or cycloalkyl having 5 to 12 carbon atoms.).

The mercapto group of the silane coupling agent having the mercapto group is easily radicalized and bonded to a polymer at the time of mixing to gelate. When the rubber composition for tread comprises the above-described zinc dithiophosphate, the radicalized mercapto group of the silane coupling agent reacts with a —S—Zn— structural part of zinc dithiophosphate before reacting with the rubber component to form a disulfide bond. That is, a radical derived from the mercapto group is captured by zinc dithiophosphate. Therefore, the reactivity of the silane coupling agent with the rubber component is lowered, and gelation can be suppressed. Furthermore, when the temperature rises during vulcanization, this disulfide bond is cleaved and reacts with the rubber component to be able to function as a silane coupling agent.

As specific examples of zinc dithiophosphate, for example, TP-50, ZBOP-S, ZBOP-50 manufactured by Rhein Chemie, compounds similar thereto (e.g., compounds in which each $R^1$, $R^2$, $R^3$, and $R^4$ is either n-propyl, iso-propyl, or n-octyl in the formula (7)), and the like can be used.

A content of zinc dithiophosphate when compounded based on 100 parts by mass of the rubber component is preferably 0.1 parts by mass or more, more preferably 0.3 part by mass or more, further preferably 0.5 parts by mass or more. When the content of zinc dithiophosphate is 0.1 parts by mass or more, processability becomes improved, silica dispersibility becomes further improved, and fuel efficiency, wet grip performance, and elongation at break tend to be more improved. Moreover, it is preferably 5 parts by mass or less, more preferably 4 parts by mass or less, further preferably 3 parts by mass or less, from the viewpoints of breaking strength and abrasion resistance.

A content of zinc dithiophosphate when compounded based on 100 parts by mass of the silane coupling agent having a mercapto group is preferably 1 part by mass or more, more preferably 3 parts by mass or more, further preferably 5 parts by mass or more. When the content of zinc dithiophosphate is 1 part by mass or more, processability becomes improved, silica dispersibility becomes more improved, and fuel efficiency, wet grip performance, and elongation at break tend to be more improved. Moreover, it is preferably 100 parts by mass or less, more preferably 60 parts by mass or less, further preferably 40 parts by mass or less, from the viewpoints of breaking strength and abrasion resistance.

The rubber composition for tread according to the present disclosure can appropriately comprise compounding agents commonly used in the conventional tire industry, such as, for example, oil, a tackifying resin, wax, processing aid, an antioxidant, and a softening agent, zinc oxide, stearic acid, a vulcanizing agent such as sulfur, and a vulcanization accelerator, in addition to the above-described components.

Examples of oil include, for example, mineral oils such as aromatic oils, process oils, and paraffin oils, and the like. Among them, it is preferable to use process oils because they reduce burden on the environment.

A content of oil when compounded based on 100 parts by mass of the rubber component is preferably 10 parts by mass or more, more preferably 15 parts by mass or more, further preferably 20 parts by mass or more, from the viewpoint of processability. Moreover, it is preferably 80 parts by mass or less, more preferably 70 parts by mass or less, further preferably 60 parts by mass or less, from the viewpoint of abrasion resistance. Besides, in the present specification, the content of oil also includes an amount of oil contained in an oil-extended rubber.

Examples of the tackifying resin include a cyclopentadiene-based resin, a coumarone resin, a petroleum-based resin (an aliphatic petroleum resin, an aromatic petroleum resin, an alicyclic petroleum resin, etc.), a phenol-based resin, a rosin derivative, and the like, preferably an aromatic petroleum resin.

Examples of the aromatic petroleum resin include, for example, the following aromatic vinyl-based resins and C9-based petroleum resins other than the aromatic vinyl-based resins, and the like, preferably aromatic vinyl-based resins.

The aromatic vinyl-based resins may include a homopolymer of an aromatic vinyl monomer (unit) and a copolymer of two or more kinds of the aromatic vinyl monomers which includes, for example, styrene, α-methylstyrene, 1-vinylnaphthalene, 3-vinyltoluene, ethylvinylbenzene, divinylbenzene, 4-cyclohexylstyrene, 2,4,6-trimethylstyrene, and the like. Moreover, those obtained by modifying them may be used.

As the aromatic vinyl-based resin, a homopolymer of α-methylstyrene or styrene or a copolymer of α-methylstyrene and styrene is preferable, and a copolymer of α-methylstyrene and styrene is more preferable, because it is economical, easy to process, and excellent in wet grip performance. As the aromatic vinyl-based resin, commercially available products such as, for example, SYLVARES SA85, SA100, SA120, SA140 manufactured by Kraton Corporation, and R2336 manufactured by Eastman Chemical Company are appropriately used. As the copolymer of α-methylstyrene and styrene, for example, SYLVATRAXX4401 manufactured by Kraton Corporation, and the like are appropriately used.

A softening point of the tackifying resin is preferably 40° C. or higher, more preferably 60° C. or higher. When the softening point is 40° C. or higher, a sufficient grip performance tends to be obtained. Moreover, the softening point is preferably 120° C. or lower, more preferably 100° C. or lower. When the softening point is 120° C. or lower, a sufficient grip performance tends to be obtained. Besides, the softening point of resin in the present specification is a temperature at which a sphere drops when the softening point specified in JIS K 6220-1: 2001 is measured with a ring and ball softening point measuring device.

A content of the tackifying resin, particularly the aromatic vinyl-based resin, when compounded based on 100 parts by mass of the rubber component is preferably 1 part by mass or more, more preferably 2 parts by mass or more, further preferably 3 parts by mass or more, particularly preferably 4 parts by mass or more, from the viewpoint of wet grip performance. Moreover, it is preferably 50 parts by mass or less, more preferably 40 parts by mass or less, further preferably 35 parts by mass or less, particularly preferably 10 parts by mass or less, from the viewpoints of fuel efficiency and abrasion resistance.

Examples of processing aid include, for example, a fatty acid metal salt, a fatty acid amide, an amide ester, a silica surface active agent, a fatty acid ester, a mixture of a fatty acid metal salt and an amide ester, a mixture of a fatty acid metal salt and a fatty acid amide, and the like. They may be used alone, or two or more thereof may be used in combination. Among them, a fatty acid metal salt, an amide ester, a mixture of a fatty acid metal salt and an amide ester, and a mixture of a fatty acid metal salt and a fatty acid amide are preferable, and a mixture of a fatty acid metal salt and a fatty acid amide is particularly preferable. Specifically, examples of processing aid include, for example, a fatty acid soap-based processing aid such as EF44 and WB16 manufactured by Schill+Seilacher.

A content of processing aid when compounded based on 100 parts by mass of the rubber component is preferably 0.5 parts by mass or more, more preferably 1 part by mass or more, from the viewpoint of exhibiting an effect of improving processability. Moreover, it is preferably 10 parts by mass or less, more preferably 8 parts by mass or less, from the viewpoints of abrasion resistance and breaking strength.

Examples of the antioxidant include, but not particularly limited to, for example, amine-based, quinoline-based, quinone-based, phenol-based, and imidazole-based compounds, and antioxidants such as a carbamic acid metal salt. Among them, phenylenediamine-based antioxidants such as N-(1,3-dimethylbutyl)-N'-phenyl-p-phenylenediamine, N-isopropyl-N'-phenyl-p-phenylenediamine, N,N'-diphenyl-p-phenylenediamine, N,N'-di-2-naphthyl-p-phenylenediamine, N-cyclohexyl-N'-phenyl-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, N-4-methyl-2-pentyl-N'-phenyl-p-phenylenediamine, N,N'-diaryl-p-phenylenediamine, hindered diaryl-p-phenylenediamine, phenylhexyl-p-phenylenediamine, and phenyloctyl-p-phenylenediamine, and quinoline-based antioxidants such as 2,2,4-trimethyl-1,2-dihydroquinoline polymer and 6-ethoxy-2,2,4-trimethyl-1,2-dihydroquinoline are preferable. Among them, quinoline-based antioxidants are more appropriately used from the viewpoint of heat resistance. These antioxidants may be used alone, or two or more thereof may be used in combination.

A content of the antioxidant when compounded based on 100 parts by mass of the rubber component is preferably 0.5 parts by mass or more, more preferably 1 part by mass or more, from the viewpoint of ozone crack resistance of a rubber. Moreover, it is preferably 10 parts by mass or less, more preferably 5 parts by mass or less, from the viewpoints of abrasion resistance and wet grip performance.

A content of wax when compounded based on 100 parts by mass of the rubber component is preferably 0.5 parts by mass or more, more preferably 1 part by mass or more, from the viewpoint of weather resistance of a rubber. Moreover, it is preferably 10 parts by mass or less, more preferably 5 parts by mass or less, from the viewpoint of whitening of a tire due to bloom.

A content of stearic acid when compounded based on 100 parts by mass of the rubber component is preferably 0.5 parts by mass or more, more preferably 1 part by mass or more, from the viewpoint of processability. Moreover, it is preferably 10 parts by mass or less, more preferably 5 parts by mass or less, from the viewpoint of vulcanization rate.

A content of zinc oxide when compounded based on 100 parts by mass of the rubber component is preferably 0.5 parts by mass or more, more preferably 1 part by mass or more, from the viewpoint of processability. Moreover, it is preferably 10 parts by mass or less, more preferably 5 parts by mass or less, from the viewpoint of abrasion resistance.

Sulfur is appropriately used as a vulcanizing agent. As sulfur, powdery sulfur, oil processing sulfur, precipitated sulfur, colloidal sulfur, insoluble sulfur, highly dispersible sulfur, and the like can be used.

A content of sulfur when compounded as a vulcanizing agent based on 100 parts by mass of the rubber component is preferably 0.5 parts by mass or more, more preferably 1.0 part by mass or more, from the viewpoints of securing a sufficient vulcanization reaction and obtaining good grip performance and abrasion resistance. Moreover, it is preferably 3.0 parts by mass or less, more preferably 2.5 parts by mass or less, further preferably 2.0 parts by mass or less, from the viewpoint of deterioration. Besides, a content of the vulcanizing agent when an oil-containing sulfur is used as the vulcanizing agent shall be a total content of pure sulfur comprised in the oil-containing sulfur.

Examples of vulcanizing agents other than sulfur include, for example, vulcanizing agents comprising a sulfur atom such as TACKIROL V200 manufactured by Taoka Chemical Co., Ltd., DURALINK HTS (sodium hexamethylene-1,6-bisthiosulfate dihydrate) manufactured by Flexsys, and KA9188 (1,6-bis(N,N'-dibenzylthiocarbamoyldithio) hexane) manufactured by LANXESS, organic peroxides such as dicumyl peroxide, and the like.

Examples of the vulcanization accelerator include, but not particularly limited to, for example, sulfenamide-based, thiazole-based, thiuram-based, thiourea-based, guanidine-based, dithiocarbamic acid-based, aldehyde-amine-based or aldehyde-ammonia-based, imidazoline-based, and xanthate-based vulcanization accelerators, and among them, sulfenamide-based vulcanization accelerators and/or thiuram-based vulcanization accelerators are preferable, and it is more preferable to use two of them in combination, from the viewpoint that desired effects can be obtained more appropriately.

Examples of the sulfenamide-based vulcanization accelerator include CBS (N-cyclohexyl-2-benzothiazolyl sulfenamide), TBBS (N-t-butyl-2-benzothiazolyl sulfenamide), N-oxyethylene-2-benzothiazolyl sulfenamide, N,N'-diisopropyl-2-benzothiazolyl sulfenamide, N,N-dicyclohexyl-2-benzothiazolyl sulfenamide, and the like. Examples of the thiazole-based vulcanization accelerator include 2-mercaptobenzothiazole, dibenzothiazolyl disulfide, and the like. Examples of the thiuram-based vulcanization accelerator include tetramethylthiuram monosulfide, tetramethylthiuram disulfide (TMTD), tetrabenzylthiuram disulfide (TBzTD), tetrakis(2-ethylhexyl)thiuram disulfide (TOT-N), and the like. Examples of the guanidine-based vulcanization accelerator include diphenylguanidine (DPG), diorthotrilguanidine, orthotrilbiguanidine, and the like. They may be used alone, or two or more thereof may be used in combination. Among them, a combination of CBS and TBzTD is particularly preferable from the viewpoint that desired effects can be obtained more appropriately.

A total content of vulcanization accelerators based on 100 parts by mass of the rubber component is preferably 1.0 part by mass or more, more preferably 1.5 parts by mass or more, further preferably 2.0 parts by mass or more. Moreover, the total content of vulcanization accelerators based on 100 parts by mass of the rubber component is preferably 8.0 parts by mass or less, more preferably 7.0 parts by mass or less, further preferably 6.0 parts by mass or less, particularly preferably 5.0 parts by mass or less. When the content of vulcanization accelerators is within the above-described ranges, breaking strength and elongation tend to be secured.

A content of the thiuram-based vulcanization accelerator when compounded based on 100 parts by mass of the rubber component is preferably 0.1 parts by mass or more, more preferably 0.2 parts by mass or more, from the viewpoint of fuel efficiency and steering stability. Moreover, it is preferably 2.0 parts by mass or less, more preferably 1.5 parts by mass or less, further preferably 1.0 part by mass or less, particularly preferably 0.8 parts by mass or less, from the viewpoint of steering stability.

The rubber composition according to the present disclosure can be produced by a known method. For example, it can be produced by a method of kneading components other than vulcanizing agents and vulcanization accelerators, of the above-described components, with a known kneading machine used in the general rubber industry such as a Banbury mixer, a kneader, and an open roll, then adding the vulcanizing agents and the vulcanization accelerators to the mixture to further knead them, and then vulcanizing them, and the like.

Since a temperature on a tread surface of a shoulder head part reaches 80 to 120° C. during high-speed running, it is necessary to improve tensile characteristics of a tread rubber at the high temperature in order to suppress uneven abrasion. An elongation at break EB of the rubber composition according to the present disclosure measured under a condition of a tensile rate of 14.0 m/sec in an atmosphere at 100° C. is preferably 180% or more, more preferably 190% or more, further preferably 200% or more, further preferably 210% or more, further preferably 220% or more, further preferably 225% or more, further preferably 230% or more, particularly preferably 240% or more. When the elongation at break is within the above-described ranges, uneven abrasion due to an increase in temperature of the tread surface of the shoulder head part can be suppressed. Besides, the elongation at break in the present disclosure is measured by producing a dumbbell-shaped No. 7 test piece made of a rubber composition after vulcanized, and carrying out a tensile test according to JIS K 6251: 2017 "Rubber, vulcanized or thermoplastics-Determination of tensile stress-strain properties".

<Tire>

The pneumatic tire according to the present disclosure comprises a tread composed of the above-described rubber composition for tread and is appropriately used for a tire for a passenger car, a high-performance tire for a passenger car, and the like. One embodiment of the present disclosure is a tire, which exclude a retread tire.

The tire comprising a tread made of the above-described rubber composition for tread can be produced by a usual method using the above-described rubber composition for tread. That is, the tire can be produced by extruding an unvulcanized rubber composition compounded from the rubber component and other components as necessary into a tread shape, attaching it together with other tire members on a tire forming machine, and molding them by a usual method to form an unvulcanized tire, followed by heating and pressurizing this unvulcanized tire in a vulcanizing machine.

FIG. 1 shows a schematic view of a cut section when a tread is pressed against a flat surface. The pneumatic tire of the present disclosure has a flattening ratio of 35 to 70%, wherein, when Y is defined by the following formula:

$$Y = (B - 16)/A$$

where A (mm) is a total width of the tire and B (mm) is a breaker width of the tire when a tread of the tire, the tire being rim-assembled on a normal rim and being in a normal state with a normal internal pressure and no load, is pressed against a flat surface with a normal load being applied, Y is 0.80 or less (preferably 0.79 or less, more preferably 0.78 or less) when the flattening ratio is 35% or more and less than 40%, Y is 0.79 or less (preferably 0.78 or less, more preferably 0.77 or less) when the flattening ratio is 40% or more and less than 45%, Y is 0.78 or less (preferably 0.77 or less, more preferably 0.76 or less) when the flattening is 45% or more and less than 50%, Y is 0.77 or less (preferably 0.76 or less, more preferably 0.75 or less) when the flattening ratio is 50% or more and less than 55%, Y is 0.75 or less (preferably 0.74 or less, more preferably 0.73 or less) when the flattening ratio is 55% or more and less than 60%, Y is 0.72 or less (preferably 0.71 or less, more preferably 0.70 or less) when the flattening ratio is 60% or more and less than 65%, Y is 0.69 or less (preferably 0.68 or less, more preferably 0.67 or less) when the flattening ratio is 65% or more and less than 70%, or Y is 0.67 or less (preferably 0.66 or less, more preferably 0.65 or less) when the flattening ratio is 70%. As such, by adjusting the total width of the tire and the breaker width of the tire, uneven abrasion can be suppressed, and early removal of the tire due to the occurrence of uneven abrasion can be avoided, so that abrasion resistance inherent to the rubber composition for tread can be fully exhibited.

In the pneumatic tire according to the present disclosure, by setting Y to the above-described predetermined numerical values or less, abrasion resistance and fuel efficiency are improved. On the other hand, when Y exceeds the above-described predetermined numerical values, particularly, fuel efficiency tends to be deteriorated. On the other hand, a lower limit value of Y is, but not particularly limited to, usually 0.50 or more, preferably 0.55 or more, more preferably 0.58 or more, further preferably 0.60 or more. Moreover, the lower limit value of Y corresponding to each of the above-described flattening ratios is preferably smaller by 0.20, more preferably smaller by 0.15, further preferably smaller by 0.10, than an upper limit value of Y corresponding to each of the above-described flattening ratios. For example, when the flattening ratio is 35% or more and less than 40%, Y can be in a range of 0.60 to 0.80, 0.65 to 0.80, 0.70 to 0.80, 0.59 to 0.79, 0.64 to 0.79, 0.69 to 0.79, 0.58 to 0.78, 0.63 to 0.78, or 0.68 to 0.78.

The flattening ratio of the pneumatic tire according to the present disclosure is not particularly limited as long as it is within a range of 35 to 70%, for example, it can be 35 to 65%, 35 to 60%, 35 to 55%, 40 to 70%, 45 to 70%, or 50-70%.

The "normal rim" is a rim defined for each tire by the standard in a standard system on which standard the tire is based. For example, it is a "standard rim" in JATMA, "Design Rim" in TRA, or "Measuring Rim" in ETRTO. Besides, if a size of the tire is not specified in the above-described standard systems, the normal rim is a rim which can be assembled to the tire and whose width is narrowest among rims having the smallest diameter that does not cause air leakage between the rim and the tire.

The "normal internal pressure" is an air pressure defined for each tire by the standard, i.e., a "maximum air pressure" in JATMA, a maximum value described in Table "TIRE LOAD LIMITS AT VARIOUS COLD INFLATION PRESSURES" in TRA, or "INFLATION PRESSURE" in ETRTO. Besides, if a size of the tire is not specified in the above-described standard systems, the normal internal pressure shall be 250 kPa.

The "normal state" is a state where the tire is rim-assembled on a normal rim, a normal internal pressure is filled, and no load is applied. Besides, in the case of a tire having a size not specified in the above-described standard systems, the normal state is a state where the tire is rim-assembled on the minimum rim, 250 kPa is filled, and no load is applied.

The "normal load" is a load defined for each tire by the standard, i.e., a maximum load capacity in JATMA, a maximum value described in Table "TIRE LOAD LIMITS AT VARIOUS COLD INFLATION PRESSURES" in TRA, or "LOAD CAPACITY" in ETRTO. Besides, in the case of a tire having a size not specified in the above-described standard systems, a normal load WL (kg) can be estimated by the following equations (1) and (2) where Wt (mm) is a cross-sectional width of the tire measured in the normal state, Ht (mm) is a cross-sectional height of the tire measured in the normal state, and Dt (mm) is an outer diameter of the tire measured in the normal state. The cross-sectional width Wt of the tire is a maximum width between outer surfaces of sidewalls excluding patterns or characters on the side surface of the tire in the above-described state. The cross-sectional height Ht of the tire is a distance from the bottom surface of a bead part to the outermost surface of a tread, and is half a difference between the outer diameter of the tire and a nominal size of a rim.

$$V = \{(Dt/2)^2 - (Dt/2 - Ht)^2\} \times \pi \times Wt \quad (1)$$

$$W_L = 0.000011 \times V + 175 \quad (2)$$

A value of Y can be obtained by appropriately using and adjusting methods such as a mold profile, a gauge distribution, and construction, though adjustment methods are not particularly limited. For example, desired values of A and B can be obtained by adjusting a width of a breaker or a width of a mold. Specifically, Y can be adjusted to a large value by increasing the width of the breaker or reducing the width of the mold, and Y can be adjusted to a small value by reducing the width of the breaker or increasing the width of the mold.

The tread of the present disclosure has at least one rubber layer. The tread of the present disclosure may be formed of a single rubber layer or may have one or more rubber layers inside in the tire radial direction of the rubber layer (cap rubber layer) whose outer surface constitutes a tread surface. When the tread of the present disclosure is composed of two or more rubber layers, at least one of the two or more rubber layers is composed of the predetermined rubber composition described above, and it is preferable that the cap rubber layer is composed of the predetermined rubber composition described above.

EXAMPLE

Hereinafter, the present disclosure will be described based on Examples, though the present disclosure is not limited to these Examples.

Various chemicals used in Examples and Comparative examples are collectively shown below.

SBR1: Modified solution-polymerized SBR synthesized in Production example 1 which will be described later (styrene content: 35% by mass, vinyl bond amount: 34 mol %, Mw: 850,000, Tg: −30° C., an oil-extended product comprising 37.5 parts by mass of an oil content based on 100 parts by mass of the rubber component)

SBR2: Modified solution-polymerized SBR produced in Production example 2 which will be described later (styrene content: 38% by mass, vinyl bond amount: 39 mol %, Mw: 800,000, Tg: −25° C., an oil-extended product comprising 25 parts by mass of an oil content based on 100 parts by mass of the rubber component)

SBR3: Modified solution-polymerized SBR produced in Production example 3 which will be described later (styrene content: 42% by mass, vinyl bond amount: 36 mol %, Mw: 800,000, Tg: −21° C., an oil-extended product comprising 10 parts by mass of an oil content based on 100 parts by mass of the rubber component)

SBR4: Modified solution-polymerized SBR produced in Production example 4 which will be described later (styrene content: 30% by mass, vinyl bond amount: 52 mol %, Mw: 250,000, Tg: −23° C., a non-oil-extended product)

BR: Ubepol BR (Registered Trademark) 150B manufactured by Ube Industries, Ltd. (vinyl bond amount: 1.5 mol %, cis 1,4 bond content: 97%, Mw: 440,000)

NR: TSR20

Carbon black: DIABLACK N220 manufactured by Mitsubishi Chemical Corporation ($N_2SA$: 115 $m^2/g$)

Silica 1: Zeosil Premium 200 MP manufactured by Solvay ($N_2SA$: 220 $m^2/g$, average primary particle size: 15 nm)

Silica 2: Ultrasil (Registered Trademark) 9100GR manufactured by Evonik Degussa GmbH ($N_2SA$: 230 $m^2/g$, average primary particle size: 15 nm)

Silica 3: Ultrasil (Registered Trademark) VN3 manufactured by Evonik Degussa GmbH ($N_2SA$: 175 $m^2/g$, average primary particle size: 18 nm)

Silane coupling agent 1: NXT-Z45 manufactured by Momentive Performance Materials (silane coupling agent having a mercapto group, a copolymer of a bond unit A and a bond unit B (bond unit A: 55 mol %, bond unit B: 45 mol %))

Silane coupling agent 2: Si69 manufactured by Evonik Degussa GmbH (bis(3-triethoxysilylpropyl)tetrasulfide)

Oil: VivaTec 400 manufactured by H&R Group (TDAE oil)

Tackifying resin: Sylvatraxx (Registered Trademark) 4401 manufactured by Kraton Corporation (copolymer of α-methylstyrene and styrene, softening point: 85° C.)

Wax: OZOACE 0355 manufactured by Nippon Seiro Co., Ltd.

Antioxidant 1: Nocrac 6C manufactured by Ouchi Shinko Chemical Industry Co., Ltd. (N-(1,3-dimethylbutyl)-N'-phenyl-p-phenylenediamine)

Antioxidant 2: Nocrac FR manufactured by Ouchi Shinko Chemical Industry Co., Ltd. (2,2,4-trimethyl-1,2-dihydroquinoline polymer)

Processing aid: STRUKTOL EF44 manufactured by Schill+Seilacher (fatty acid zinc)

Stearic acid: Bead stearic acid "CAMELLIA" manufactured by NOF CORPORATION

Zinc oxide: Zinc oxide No. 1 manufactured by Mitsui Mining & Smelting Co., Ltd.

Zinc dithiophosphate: TP-50 manufactured by Rhein Chemie (compound represented by the formula (7), $R^1$ to $R^4$: n-butyl group, content of active component: 50% by mass)

Sulfur: HK-200-5 manufactured by Hosoi Chemical Industry Co., Ltd. (5% oil-containing powdered sulfur)

Vulcanization accelerator 1: Nocceler CZ manufactured by Ouchi Shinko Chemical Industry Co., Ltd. (N-cyclohexyl-2-benzothiazolylsulfenamide (CBS))

Vulcanization accelerator 2: Sanceler TBZTD manufactured by Sanshin Chemical Industry Co., Ltd. (Tetrabenzyl Thiuram Disulfide (TBzTD))

Production Example 1: Synthesis of SBR1

An autoclave reactor (internal volume 20 L) with a stirrer and a jacket was subjected to nitrogen purge, and while controlling the temperature at 70° C., styrene, 1,3-butadiene comprising 100 ppm of 1,2-butadiene, cyclohexane, tetrahydrofuran, and n-butyllithium were continuously charged at a rate of 10.5 g/min, at a rate of 19.5 g/min, at a rate of 150 g/min, at a rate of 1.5 g/min, and at a rate of 0.117 mmol/min, respectively. Silicon tetrachloride was continuously added at a rate of 0.04 mmol/min at the top outlet of a first reactor vessel and introduced into a second reactor vessel coupled to the first reactor vessel to perform a modification reaction. 2,6-di-tert-butyl-p-cresol was added to a polymer solution after completion of a polymerization reaction. Next, after adding 37.5 parts by mass of an extended oil (VivaTec 400 manufactured by H&R Group) based on 100 parts by mass of the polymer, the mixture was subjected to removal of solvent by a steam stripping and dried by a heat roll whose temperature was adjusted to 110° C. to obtain a SBR1.

Production Example 2: Synthesis of SBR2

Two autoclaves each having an inlet at the bottom and an outlet at the head, and with a stirrer and a jacket, were coupled in series as reactors (internal volume 10 L), and butadiene, styrene, and cyclohexane were mixed at a predetermined ratio under a nitrogen atmosphere. This mixed solution put through a dehydration column filled with active alumina was continuously supplied from the bottom of the first reactor after mixing n-butyllithium with a static mixer in order to remove impurities, and further, 2,2-bis(2-oxolanyl)propane and n-butyllithium were continuously supplied from the bottom of the first reactor as a polar substance and as a polymerization initiator, respectively, at a predetermined rate, and the temperature inside the reactor was kept at 95° C. The polymer solution was continuously extracted from the head of the reactor and supplied to the second reactor. While keeping the temperature of the second reactor at 95° C., a mixture of tetraglycidyl-1,3-bisaminomethylcyclohexane (monomer) as a modifying agent and an oligomer component was continuously added as a solution diluted by 1,000 times of cyclohexane at a predetermined rate to perform a modification reaction. This polymer solution was continuously extracted from the reactor, and 2,6-di-tert-butyl-p-cresol was continuously added with a static mixer. Next, after adding 25 parts by mass of an extended oil (NC-140 manufactured by JX Nippon Oil & Energy Corporation) based on 100 parts by mass of the polymer, the mixture was subjected to removal of solvent by a steam stripping and dried by a heat roll whose temperature was adjusted to 110° C. to obtain a SBR2.

Production Example 3: Synthesis of SBR3

An autoclave reactor subjected to nitrogen purge was charged with cyclohexane, tetrahydrofuran, styrene, and 1,3-butadiene. After adjusting temperature of contents in the reactor to 20° C., n-butyllithium was added to initiate polymerization. The polymerization was performed under an adiabatic condition, and the temperature reached 85° C. of the maximum temperature. When a polymerization conversion rate reached 99%, 1,3-butadiene was added, and after further polymerization for 5 minutes, N,N-bis(trimethylsilyl)-3-aminopropyltrimethoxysilane was added as a modifying agent to perform reaction. After completion of the polymerization reaction, 2,6-di-tert-butyl-p-cresol was added. Next, after adding 10 parts by mass of an extended oil based on 100 parts by mass of the polymer, the mixture was subjected to removal of solvent by a steam stripping and dried by a heat roll whose temperature was adjusted to 110° C. to obtain a SBR3.

Production Example 4: Synthesis of SBR4

An autoclave reactor subjected to nitrogen purge was charged with cyclohexane, tetrahydrofuran, styrene, and 1,3-butadiene. After adjusting temperature of contents in the reactor to 20° C., n-butyllithium was added to initiate polymerization. The polymerization was performed under an adiabatic condition, and the temperature reached 85° C. of the maximum temperature. When a polymerization conversion rate reached 99%, 1,3-butadiene was added, and after further polymerization for 5 minutes, N,N-bis(trimethylsilyl)-3-aminopropyltrimethoxysilane was added as a modifying agent to perform reaction. After completion of the polymerization reaction, 2,6-di-tert-butyl-p-cresol was added. Next, the mixture was subjected to removal of solvent by a steam stripping and dried by a heat roll whose temperature was adjusted to 110° C. to obtain a SBR4.

Examples and Comparative Examples

According to the compounding formulations shown in Tables 1 to 3, using a 1.7 L closed Banbury mixer, all chemicals other than sulfur and vulcanization accelerators were kneaded until a discharge temperature from 150° C. to 160° C. for a period of 1 to 10 minutes to obtain a kneaded product. Next, using a twin-screw open roll, sulfur and vulcanization accelerators were added to the obtained kneaded product, and the mixture was kneaded for 4 minutes until the temperature reached 105° C. to obtain an unvulcanized rubber composition. The obtained unvulcanized rubber composition was press-vulcanized at 170° C. for 12 minutes to produce a test rubber composition.

Moreover, the above-described unvulcanized rubber composition was extruded into a shape of tire tread with an extruder equipped with a mouthpiece having a predetermined shape and attached together with other tire members, forming an unvulcanized tire, and the unvulcanized tire was press-vulcanized under a condition of 170° C. for 12 minutes to prepare a test tire 1 (size: 205/55R16, rim: 16×7.0, internal pressure: 250 kPa), a test tire 2 (size: 185/70R14, rim: 14×5.5, internal pressure: 250 kPa), and a test tire 3 (size: 255/35R18, rim: 18×9.0, internal pressure: 250 kPa), respectively.

The obtained test rubber composition and test tires were evaluated as follows. Table 1 shows evaluation results for the test tire 1 (flattening ratio: 55%), Table 2 shows evaluation results for the test tire 2 (flattening ratio: 70%), and Table 3 shows evaluation results for the test tire 3 (flattening ratio: 35%).

<Elongation at Break>

A dumbbell-shaped No. 7 test piece composed of each vulcanized rubber composition was produced, and a tensile test was performed in an atmosphere at 100° C. under a condition of a tensile rate of 14.0 m/sec according to JIS K 6251: 2017 "Rubber, vulcanized or thermoplastics-Determination of tensile stress-strain properties", to measure an elongation at break (elongation at the time of cutting) EB (%).

<Fuel Efficiency (Lab)>

A strip test piece having a width of 4 mm, a length of 50 mm, and a thickness of 2 mm was punched out from a sheet-shaped vulcanized rubber composition and provided for a test. Using a spectrometer manufactured by Ueshima Seisakusho Co., Ltd., a loss tangent (tan δ) of the vulcanized rubber sheet was measured at a dynamic strain amplitude of 1%, a frequency of 10 Hz, and a temperature at 50° C., and an inverse value of tan δ was displayed as an index with Reference comparative examples (Comparative example 1 in Table 1, Comparative example 7 in Table 2, Comparative example 10 in Table 3, the same in hereinafter) being 100. The larger the numerical value is, the smaller the rolling resistance is, and the more excellent the fuel efficiency is.

(Fuel efficiency index(lab)) = (Tan δ of Reference comparative example)/

(Tan δ of each Compounding example) × 100

<Fuel Efficiency (Tire)>

For each test tire, a rolling resistance coefficient (RRC) was measured in accordance with JIS D 4234: 2009 (ISO28580), and an inverse value of the rolling resistance coefficient was displayed as an index with Reference comparative example being 100 in each table. The larger the index is, the smaller the rolling resistance is, and the more excellent the fuel efficiency is.

(Fuel efficiency index(tire)) =

(Rolling resistance coefficient of Reference comparative example)/

(Rolling resistance coefficient of each test tire) × 100

<Wet Grip Performance (Lab)>

Wet grip performance was evaluated using a flat belt type abrasion tester (FR5010 type) manufactured by Ueshima Seisakusho Co., Ltd. Using a cylindrical rubber test piece having a width of 20 mm and a diameter of 100 mm of each vulcanized rubber composition as a sample, a slip ratio of the sample with respect to a road surface was changed from 0 to 70% under a condition of a speed of 20 km/hour, a load of 4 kgf, and a road surface temperature at 20° C., and the maximum value of a coefficient of friction detected at that time was read. Then, a measurement result was displayed as an index by the following equation. The larger the index is, the larger the coefficient of friction is, and the more excellent the wet grip performance is.

(Wet grip performance index(lab)) =

(Maximum value of coefficient of friction of each

Compounding example) / (Maximum value of coefficient of friction of Reference comparative example) × 100

<Wet Grip Performance (Actual Vehicle)>

Each test tire was mounted on all wheels of a vehicle (domestic FF2000 cc), and a braking distance from an initial speed of 100 km/h on a wet asphalt road surface was measured, which was displayed as an index with Reference comparative example being 100 in each table. The larger the index is, the shorter the braking distance is, and the more excellent the wet grip performance is.

(Wet grip performance index(actual vehicle)) =

(Braking distance of Reference comparative example)/

(Braking distance of each test tire) × 100

<Steering Stability at High-Speed Running>

Each test tire was mounted on a domestic FR vehicle with a displacement of 2000 cc. The vehicle was run on a test course with a dry asphalt road surface at about 120 km/hour, and handling characteristics during straight running, lane change, and acceleration/deceleration were evaluated with a sensory evaluation by a test driver. The evaluation results were displayed as indexes with the handling characteristics of Reference comparative example being 100 in each table, according to the following criteria, to calculate an average value in the above-described three cases, and an index value thereof was shown in the column of "Steering stability" in Tables 1 to 3. The larger the index value is, the better the handling characteristics is, and the more excellent the steering stability at high-speed running is.

(Standards for Handling Characteristics)
- 120: Better level than ever seen
- 110: Judged by the test driver that the performance was clearly improved
- 105: Felt a little better by the test driver
- 100: Standard
- 90: Felt a little inferior to the standard
- 80: Judged by the test driver that the performance was clearly deteriorated <Uneven Abrasion Resistance During High-Speed Running>

Each test tire was mounted on a domestic FR vehicle with a displacement of 2000 cc. After the vehicle was run 50 km on a test course with a dry asphalt road surface at an average speed of 120 km/h, a difference in abrasion amount on both sides in a tire circumferential direction of a center block, a middle block, and a shoulder block of the rear wheels was measured. For each block, eight measurements were conducted with a substantially equal pitch in the tire circumferential direction, and an average value of all the measured values was calculated. Then, a measurement result was displayed as an index by the following equation. The results show that the larger the index is, the better the uneven abrasion resistance is. A performance target value shall be 108 or more for uneven abrasion resistance.

(Uneven abrasion resistance index) =
(Difference in abrasion amount of Reference comparative example)/
(Difference in abrasion amount of each test tire) × 100

Besides, a performance target value shall be 105 or more, preferably 108 or more, more preferably 110 or more, for a total performance of fuel efficiency (tire), wet grip performance (actual vehicle), steering stability, and uneven abrasion resistance (an average value of fuel efficiency (tire), wet grip performance (actual vehicle), steering stability, and uneven abrasion resistance).

TABLE 1

|  | Example |  |  |  |  |  |  |  |  |
|---|---|---|---|---|---|---|---|---|---|
|  | 1 | 2 | 3 | 4 | 5 | 6 | 7 | 8 | 9 |
| Compounding amount (part by mass) | | | | | | | | | |
| SBR1 | 110 | — | — | 110 | 110 | — | — | 110 | 110 |
| SBR2 | — | 100 | — | — | — | — | — | — | — |
| SBR3 | — | — | 88 | — | — | 99 | 77 | — | — |
| SBR4 | — | — | — | — | — | — | — | — | — |
| BR | 20 | 20 | 20 | 20 | 20 | 10 | 30 | 10 | 20 |
| NR | — | — | — | — | — | — | — | 10 | — |
| Carbon black | 5.0 | 5.0 | 5.0 | 5.0 | 5.0 | 5.0 | 5.0 | 5.0 | 5.0 |
| Silica 1 | 80 | 80 | 80 | 60 | — | 80 | 80 | 80 | 80 |
| Silica 2 | — | — | — | — | 80 | — | — | — | — |
| Silica 3 | — | — | — | — | — | — | — | — | — |
| Silane coupling agent 1 | 8.0 | 8.0 | 8.0 | 6.0 | 8.0 | 8.0 | 8.0 | 8.0 | 8.0 |
| Silane coupling agent 2 | — | — | — | — | — | — | — | — | — |
| Oil | 10 | 10 | 22 | 10 | 10 | 10 | 10 | 10 | 10 |
| Tackifying agent | 10 | 10 | 10 | 10 | 10 | 10 | 10 | 10 | 10 |
| Wax | 2.0 | 2.0 | 2.0 | 2.0 | 2.0 | 2.0 | 2.0 | 2.0 | 2.0 |
| Antioxidant 1 | 2.5 | 2.5 | 2.5 | 2.5 | 2.5 | 2.5 | 2.5 | 2.5 | 2.5 |
| Antioxidant 2 | 1.0 | 1.0 | 1.0 | 1.0 | 1.0 | 1.0 | 1.0 | 1.0 | 1.0 |
| Processing aid | 2.0 | 2.0 | 2.0 | 2.0 | 2.0 | 2.0 | 2.0 | 2.0 | 2.0 |
| Stearic acid | 2.0 | 2.0 | 2.0 | 2.0 | 2.0 | 2.0 | 2.0 | 2.0 | 2.0 |
| Zinc oxide | 2.0 | 2.0 | 2.0 | 2.0 | 2.0 | 2.0 | 2.0 | 2.0 | 2.0 |
| Zinc dithiophosphate | 1.0 | 1.0 | 1.0 | 1.0 | 1.0 | 1.0 | 1.0 | 1.0 | 1.0 |
| Sulfur | 1.2 | 1.2 | 1.2 | 1.2 | 1.2 | 1.2 | 1.2 | 1.2 | 1.2 |
| Vulcanization accelerator 1 | 2.0 | 2.0 | 2.0 | 2.0 | 2.0 | 2.0 | 2.0 | 2.0 | 2.0 |
| Vulcanization accelerator 2 | 0.2 | 0.2 | 0.2 | 0.2 | 0.2 | 0.2 | 0.2 | 0.2 | 0.2 |
| (B-16)/A | 0.73 | 0.73 | 0.73 | 0.73 | 0.73 | 0.73 | 0.73 | 0.73 | 0.70 |
| C/D | 5.3 | 5.3 | 5.3 | 4.0 | 5.3 | 5.3 | 5.3 | 5.3 | 5.3 |
| Total styrene content | 28 | 30 | 34 | 28 | 28 | 38 | 29 | 28 | 28 |
| Evaluation | | | | | | | | | |
| Elongation at break EB (%) | 260 | 250 | 240 | 230 | 270 | 235 | 240 | 270 | 260 |
| Fuel efficiency (lab) | 100 | 105 | 111 | 116 | 98 | 108 | 113 | 98 | 100 |
| Fuel efficiency (tire) | 121 | 118 | 126 | 142 | 116 | 119 | 130 | 118 | 126 |

TABLE 1-continued

| | | | | | | | | |
|---|---|---|---|---|---|---|---|---|
| Wet grip performance (lab) | 100 | 96 | 96 | 92 | 101 | 103 | 93 | 96 | 100 |
| Wet grip performance (actual vehicle) | 111 | 108 | 108 | 104 | 113 | 114 | 105 | 108 | 108 |
| Steering stability | 107 | 108 | 106 | 103 | 111 | 109 | 105 | 108 | 105 |
| Uneven abrasion resistance | 118 | 116 | 115 | 110 | 124 | 112 | 117 | 125 | 123 |

| | Comparative example | | | | | |
|---|---|---|---|---|---|---|
| | 1 | 2 | 3 | 4 | 5 | 6 |
| Compounding amount (part by mass) | | | | | | |
| SBR1 | 110 | — | 110 | 110 | 110 | — |
| SBR2 | — | — | — | — | — | — |
| SBR3 | — | — | — | — | — | 55 |
| SBR4 | — | 80 | — | — | — | — |
| BR | 20 | 20 | 20 | 20 | 20 | 50 |
| NR | — | — | — | — | — | — |
| Carbon black | 5.0 | 5.0 | 5.0 | 5.0 | 5.0 | 5.0 |
| Silica 1 | 80 | 80 | — | 80 | 40 | 80 |
| Silica 2 | — | — | — | — | — | — |
| Silica 3 | — | — | 80 | — | — | — |
| Silane coupling agent 1 | 8.0 | 8.0 | 6.4 | — | 4.0 | 8.0 |
| Silane coupling agent 2 | — | — | — | 8.0 | — | — |
| Oil | 10 | 30 | 10 | 10 | 10 | 10 |
| Tackifying agent | 10 | 10 | 10 | 10 | 10 | 10 |
| Wax | 2.0 | 2.0 | 2.0 | 2.0 | 2.0 | 2.0 |
| Antioxidant 1 | 2.5 | 2.5 | 2.5 | 2.5 | 2.5 | 2.5 |
| Antioxidant 2 | 1.0 | 1.0 | 1.0 | 1.0 | 1.0 | 1.0 |
| Processing aid | 2.0 | 2.0 | 2.0 | 2.0 | 2.0 | 2.0 |
| Stearic acid | 2.0 | 2.0 | 2.0 | 2.0 | 2.0 | 2.0 |
| Zinc oxide | 2.0 | 2.0 | 2.0 | 2.0 | 2.0 | 2.0 |
| Zinc dithiophosphate | 1.0 | 1.0 | 1.0 | 1.0 | 1.0 | 1.0 |
| Sulfur | 1.2 | 1.2 | 1.2 | 1.2 | 1.2 | 1.2 |
| Vulcanization accelerator 1 | 2.0 | 2.0 | 2.0 | 2.0 | 2.0 | 2.0 |
| Vulcanization accelerator 2 | 0.2 | 0.2 | 0.2 | 0.2 | 0.2 | 0.2 |
| (B-16)/A | 0.80 | 0.73 | 0.73 | 0.73 | 0.73 | 0.73 |
| C/D | 5.3 | 5.3 | 4.4 | 5.3 | 2.7 | 5.3 |
| Total styrene content | 28 | 24 | 28 | 28 | 28 | 21 |
| Evaluation | | | | | | |
| Elongation at break EB (%) | 260 | 200 | 160 | 180 | 160 | 220 |
| Fuel efficiency (lab) | 100 | 103 | 105 | 94 | 118 | 121 |
| Fuel efficiency (tire) | 100 | 113 | 118 | 102 | 120 | 124 |
| Wet grip performance (lab) | 100 | 93 | 98 | 98 | 79 | 71 |
| Wet grip performance (actual vehicle) | 100 | 91 | 102 | 103 | 81 | 74 |
| Steering stability | 100 | 89 | 96 | 91 | 85 | 92 |
| Uneven abrasion resistance | 100 | 102 | 86 | 88 | 82 | 106 |

TABLE 2

| | Example | | | | | Comparative example | | |
|---|---|---|---|---|---|---|---|---|
| | 10 | 11 | 12 | 13 | 14 | 7 | 8 | 9 |
| Compounding amount (part by mass) | | | | | | | | |
| SBR1 | 110 | 110 | 110 | — | 110 | 110 | 110 | 110 |
| SBR2 | — | — | — | — | — | — | — | — |
| SBR3 | — | — | — | 77 | — | — | — | — |
| SBR4 | — | — | — | — | — | — | — | — |
| BR | 20 | 20 | 20 | 30 | 20 | 20 | 20 | 20 |
| NR | — | — | — | — | — | — | — | — |

TABLE 2-continued

|  | Example | | | | | Comparative example | | |
|---|---|---|---|---|---|---|---|---|
|  | 10 | 11 | 12 | 13 | 14 | 7 | 8 | 9 |
| Carbon black | 5.0 | 5.0 | 5.0 | 5.0 | 5.0 | 5.0 | 5.0 | 5.0 |
| Silica 1 | 80 | 60 | — | 80 | 80 | 80 | — | 40 |
| Silica 2 | — | — | 80 | — | — | — | — | — |
| Silica 3 | — | — | — | — | — | — | 80 | — |
| Silane coupling agent 1 | 8.0 | 6.0 | 8.0 | 8.0 | 8.0 | 8.0 | 6.4 | 4.0 |
| Silane coupling agent 2 | — | — | — | — | — | — | — | — |
| Oil | 10 | 10 | 10 | 10 | 10 | 10 | 10 | 10 |
| Tackifying agent | 10 | 10 | 10 | 10 | 10 | 10 | 10 | 10 |
| Wax | 2.0 | 2.0 | 2.0 | 2.0 | 2.0 | 2.0 | 2.0 | 2.0 |
| Antioxidant 1 | 2.5 | 2.5 | 2.5 | 2.5 | 2.5 | 2.5 | 2.5 | 2.5 |
| Antioxidant 2 | 1.0 | 1.0 | 1.0 | 1.0 | 1.0 | 1.0 | 1.0 | 1.0 |
| Processing aid | 2.0 | 2.0 | 2.0 | 2.0 | 2.0 | 2.0 | 2.0 | 2.0 |
| Stearic acid | 2.0 | 2.0 | 2.0 | 2.0 | 2.0 | 2.0 | 2.0 | 2.0 |
| Zinc oxide | 2.0 | 2.0 | 2.0 | 2.0 | 2.0 | 2.0 | 2.0 | 2.0 |
| Zinc dithiophosphate | 1.0 | 1.0 | 1.0 | 1.0 | 1.0 | 1.0 | 1.0 | 1.0 |
| Sulfur | 1.2 | 1.2 | 1.2 | 1.2 | 1.2 | 1.2 | 1.2 | 1.2 |
| Vulcanization accelerator 1 | 2.0 | 2.0 | 2.0 | 2.0 | 2.0 | 2.0 | 2.0 | 2.0 |
| Vulcanization accelerator 2 | 0.2 | 0.2 | 0.2 | 0.2 | 0.2 | 0.2 | 0.2 | 0.2 |
| (B-16)/A | 0.65 | 0.65 | 0.65 | 0.65 | 0.62 | 0.72 | 0.65 | 0.65 |
| C/D | 5.3 | 4.0 | 5.3 | 5.3 | 5.3 | 5.3 | 4.4 | 2.7 |
| Total styrene content | 28 | 28 | 28 | 29 | 28 | 28 | 28 | 28 |
| Evaluation | | | | | | | | |
| Elongation at break EB (%) | 260 | 230 | 270 | 240 | 260 | 260 | 160 | 160 |
| Fuel efficiency (lab) | 100 | 116 | 98 | 113 | 100 | 100 | 105 | 118 |
| Fuel efficiency (tire) | 121 | 142 | 116 | 130 | 126 | 100 | 118 | 120 |
| Wet grip performance (lab) | 100 | 92 | 101 | 93 | 100 | 100 | 98 | 79 |
| Wet grip performance (actual vehicle) | 111 | 104 | 113 | 105 | 108 | 100 | 102 | 81 |
| Steering stability | 108 | 105 | 113 | 106 | 106 | 100 | 95 | 83 |
| Uneven abrasion resistance | 119 | 110 | 125 | 118 | 125 | 100 | 85 | 81 |

TABLE 3

|  | Example | | | | | Comparative example | | |
|---|---|---|---|---|---|---|---|---|
|  | 15 | 16 | 17 | 18 | 19 | 10 | 11 | 12 |
| Compounding amount (part by mass) | | | | | | | | |
| SBR1 | 110 | 110 | 110 | — | 110 | 110 | 110 | 110 |
| SBR2 | — | — | — | — | — | — | — | — |
| SBR3 | — | — | — | 77 | — | — | — | — |
| SBR4 | — | — | — | — | — | — | — | — |
| BR | 20 | 20 | 20 | 30 | 20 | 20 | 20 | 20 |
| NR | — | — | — | — | — | — | — | — |
| Carbon black | 5.0 | 5.0 | 5.0 | 5.0 | 5.0 | 5.0 | 5.0 | 5.0 |
| Silica 1 | 80 | 60 | — | 80 | 80 | 80 | — | 40 |
| Silica 2 | — | — | 80 | — | — | — | — | — |
| Silica 3 | — | — | — | — | — | — | 80 | — |
| Silane coupling agent 1 | 8.0 | 6.0 | 8.0 | 8.0 | 8.0 | 8.0 | 6.4 | 4.0 |
| Silane coupling agent 2 | — | — | — | — | — | — | — | — |
| Oil | 10 | 10 | 10 | 10 | 10 | 10 | 10 | 10 |
| Tackifying agent | 10 | 10 | 10 | 10 | 10 | 10 | 10 | 10 |
| Wax | 2.0 | 2.0 | 2.0 | 2.0 | 2.0 | 2.0 | 2.0 | 2.0 |
| Antioxidant 1 | 2.5 | 2.5 | 2.5 | 2.5 | 2.5 | 2.5 | 2.5 | 2.5 |
| Antioxidant 2 | 1.0 | 1.0 | 1.0 | 1.0 | 1.0 | 1.0 | 1.0 | 1.0 |
| Processing aid | 2.0 | 2.0 | 2.0 | 2.0 | 2.0 | 2.0 | 2.0 | 2.0 |
| Stearic acid | 2.0 | 2.0 | 2.0 | 2.0 | 2.0 | 2.0 | 2.0 | 2.0 |
| Zinc oxide | 2.0 | 2.0 | 2.0 | 2.0 | 2.0 | 2.0 | 2.0 | 2.0 |

TABLE 3-continued

|  | Example | | | | | Comparative example | | |
| --- | --- | --- | --- | --- | --- | --- | --- | --- |
|  | 15 | 16 | 17 | 18 | 19 | 10 | 11 | 12 |
| Zinc dithiophosphate | 1.0 | 1.0 | 1.0 | 1.0 | 1.0 | 1.0 | 1.0 | 1.0 |
| Sulfur | 1.2 | 1.2 | 1.2 | 1.2 | 1.2 | 1.2 | 1.2 | 1.2 |
| Vulcanization accelerator 1 | 2.0 | 2.0 | 2.0 | 2.0 | 2.0 | 2.0 | 2.0 | 2.0 |
| Vulcanization accelerator 2 | 0.2 | 0.2 | 0.2 | 0.2 | 0.2 | 0.2 | 0.2 | 0.2 |
| (B-16)/A | 0.78 | 0.78 | 0.78 | 0.78 | 0.75 | 0.85 | 0.78 | 0.78 |
| C/D | 5.3 | 4.0 | 5.3 | 5.3 | 5.3 | 5.3 | 4.4 | 2.7 |
| Total styrene content | 28 | 28 | 28 | 29 | 28 | 28 | 28 | 28 |
| Evaluation | | | | | | | | |
| Elongation at break EB (%) | 260 | 230 | 270 | 240 | 260 | 260 | 160 | 160 |
| Fuel efficiency (lab) | 100 | 116 | 98 | 113 | 100 | 100 | 105 | 118 |
| Fuel efficiency (tire) | 121 | 142 | 116 | 130 | 126 | 100 | 118 | 120 |
| Wet grip performance (lab) | 100 | 92 | 101 | 93 | 100 | 100 | 98 | 79 |
| Wet grip performance (actual vehicle) | 111 | 104 | 113 | 105 | 108 | 100 | 102 | 81 |
| Steering stability | 109 | 106 | 113 | 107 | 106 | 100 | 96 | 85 |
| Uneven abrasion resistance | 120 | 112 | 126 | 119 | 124 | 100 | 87 | 83 |

From the results in Tables 1 to 3, it can be found that the pneumatic tire of the present disclosure, in which the total width of the tire and the breaker width of the tire satisfy predetermined requirements and the elongation at break and/or compounding of the rubber composition of the tread is made to have specific conditions, is excellent in uneven abrasion resistance during high-speed running. Moreover, it can be found that, in a preferred embodiment, fuel efficiency, wet grip performance, and steering stability during high-speed running are improved with good balance.

Examples of embodiments of this present disclosure are given below.

[1] A pneumatic tire having a flattening ratio of 35 to 70%, wherein, when Y is defined by the following formula:

$$Y = (B - 16)/A$$

where A (mm) is a total width of the tire and B (mm) is a breaker width of the tire when a tread of the tire, the tire being rim-assembled on a normal rim and being in a normal state with a normal internal pressure and no load, is pressed against a flat surface with a normal load being applied, a range of the value of Y changes according to the flattening ratio as follows:
when the flattening ratio is 35% or more and less than 40%, Y is 0.80 or less, when the flattening ratio is 40% or more and less than 45%, Y is 0.79 or less, when the flattening is 45% or more and less than 50%, Y is 0.78 or less, when the flattening ratio is 50% or more and less than 55%, Y is 0.77 or less, when the flattening ratio is 55% or more and less than 60%, Y is 0.75 or less, when the flattening ratio is 60% or more and less than 65%, Y is 0.72 or less, when the flattening ratio is 65% or more and less than 70%, Y is 0.69 or less, when the flattening ratio is 70%, Y is 0.67 or less, and wherein an elongation at break of a rubber composition of the tread measured under the following test condition is 180% or more:

(Test Condition)
Tensile rate: 14.0 m/sec
Temperature: 100° C.
Test piece: Dumbbell-shaped No. 7

[2] The pneumatic tire of [1] above, wherein the rubber composition of the tread comprises a styrene-butadiene rubber,

[3] The pneumatic tire of [1] or [2] above, wherein the rubber composition of the tread comprises silica and a silane coupling agent having a mercapto group,

[4] A pneumatic tire having a flattening ratio of 35 to 70%, wherein, when Y is defined by the following formula:

$$Y = (B - 16)/A$$

where A (mm) is a total width of the tire and B (mm) is a breaker width of the tire when a tread of the tire, the tire being rim-assembled on a normal rim and being in a normal state with a normal internal pressure and no load, is pressed against a flat surface with a normal load being applied, a range of the value of Y changes according to the flattening ratio as follows:
when the flattening ratio is 35% or more and less than 40%, Y is 0.80 or less, when the flattening ratio is 40% or more and less than 45%, Y is 0.79 or less, when the flattening is 45% or more and less than 50%, Y is 0.78 or less, when the flattening ratio is 50% or more and less than 55%, Y is 0.77 or less, when the flattening ratio is 55% or more and less than 60%, Y is 0.75 or less, when the flattening ratio is 60% or more and less than 65%, Y is 0.72 or less, when the flattening ratio is 65% or more and less than 70%, Y is 0.69 or less, when the flattening ratio is 70%, Y is 0.67 or less, wherein a rubber composition of the tread comprises a rubber component comprising a styrene-butadiene rubber, silica, and a silane coupling agent having a mercapto group, wherein a total styrene content in the styrene-butadiene rubber and a butadiene rubber is 25% by mass or more, and wherein, when a content of silica based on 100 parts by mass of the rubber component is C (part(s) by mass) and an average primary particle size of silica is D (nm), C/D is 3.8 or higher,

[5] The pneumatic tire of [4] above, wherein the rubber composition of the tread has an elongation at break of 180% or more measured under the following test condition, (Test Condition)
Tensile rate: 14.0 m/sec
Temperature: 100° C.
Test piece: Dumbbell-shaped No. 7

[6] The pneumatic tire of any one of [2] to [5] above, wherein the styrene-butadiene rubber comprises a modified styrene-butadiene rubber,

[7] The pneumatic tire of any one of [1] to [6] above, wherein the rubber composition of the tread comprises zinc dithiophosphate,

[8] The pneumatic tire of any one of [1] to [7] above, wherein the rubber composition of the tread comprises a thiuram-based vulcanization accelerator.

[9] The pneumatic tire of any one of [1] to [8] above, wherein the rubber composition of the tread comprises a tackifying resin.

[10] The pneumatic tire of any one of [1] to [9] above, wherein the rubber composition of the tread comprises processing aid.

[11] The pneumatic tire of any one of [1] to [10] above, wherein the rubber composition of the tread comprises silica having a nitrogen adsorption specific surface area ($N_2$SA) of 180 m$^2$/g or more.

[12] The pneumatic tire of any one of [4] to [11] above, wherein C/D is 4.5 or higher.

[13] The pneumatic tire of any one of [1] to [12] above, wherein the rubber composition of the tread has an elongation at break of 225% or more measured under the following test condition, (Test Condition)
Tensile rate: 14.0 m/sec
Temperature: 100° C.
Test piece: Dumbbell-shaped No. 7

[14] The pneumatic tire of any one of [1] to [13] above, wherein the pneumatic tires is a tire for a passenger car.

What is claimed is:

1. A pneumatic tire having a flattening ratio of 35 to 70%, wherein, when Y is defined by the following formula:

$$Y = (B - 16)/A$$

where A (mm) is a total width of the tire and B (mm) is a breaker width of the tire when a tread of the tire, the tire being rim-assembled on a normal rim and being in a normal state with a normal internal pressure and no load, is pressed against a flat surface with a normal load being applied,
a range of the value of Y changes according to the flattening ratio as follows:
when the flattening ratio is 35% or more and less than 40%, Y is 0.80 or less,
when the flattening ratio is 40% or more and less than 45%, Y is 0.79 or less,
when the flattening is 45% or more and less than 50%, Y is 0.78 or less,
when the flattening ratio is 50% or more and less than 55%, Y is 0.77 or less,
when the flattening ratio is 55% or more and less than 60%, Y is 0.75 or less,
when the flattening ratio is 60% or more and less than 65%, Y is 0.72 or less,
when the flattening ratio is 65% or more and less than 70%, Y is 0.69 or less,
when the flattening ratio is 70%, Y is 0.67 or less, and
wherein an elongation at break of a rubber composition of the tread measured under the following test condition is 180% or more:
(Test condition)
Tensile rate: 14.0 m/sec
Temperature: 100° C.
Test piece: Dumbbell-shaped No. 7.

2. The pneumatic tire of claim 1, wherein the rubber composition of the tread comprises a styrene-butadiene rubber.

3. The pneumatic tire of claim 1, wherein the rubber composition of the tread comprises silica and a silane coupling agent having a mercapto group.

4. A pneumatic tire having a flattening ratio of 35 to 70%, wherein, when Y is defined by the following formula:

$$Y = (B - 16)/A$$

where A (mm) is a total width of the tire and B (mm) is a breaker width of the tire when a tread of the tire, the tire being rim-assembled on a normal rim and being in a normal state with a normal internal pressure and no load, is pressed against a flat surface with a normal load being applied,
a range of the value of Y changes according to the flattening ratio as follows:
when the flattening ratio is 35% or more and less than 40%, Y is 0.80 or less,
when the flattening ratio is 40% or more and less than 45%, Y is 0.79 or less,
when the flattening is 45% or more and less than 50%, Y is 0.78 or less,
when the flattening ratio is 50% or more and less than 55%, Y is 0.77 or less,
when the flattening ratio is 55% or more and less than 60%, Y is 0.75 or less,
when the flattening ratio is 60% or more and less than 65%, Y is 0.72 or less,
when the flattening ratio is 65% or more and less than 70%, Y is 0.69 or less,
when the flattening ratio is 70%, Y is 0.67 or less,
wherein a rubber composition of the tread comprises a rubber component comprising a styrene-butadiene rubber, silica, and a silane coupling to agent having a mercapto group,
wherein a total styrene content in the styrene-butadiene rubber and a butadiene rubber is 25% by mass or more, and
wherein, when a content of silica based on 100 parts by mass of the rubber component is C (part(s) by mass) and an average primary particle size of silica is D (nm), C/D is 3.8 or higher.

5. The pneumatic tire of claim 4, wherein the rubber composition of the tread has an elongation at break of 180% or more measured under the following test condition,
(Test condition)
Tensile rate: 14.0 m/sec
Temperature: 100° C.
Test piece: Dumbbell-shaped No. 7.

6. The pneumatic tire of claim 2, wherein the styrene-butadiene rubber comprises a modified styrene-butadiene rubber.

7. The pneumatic tire of claim 1, wherein the rubber composition of the tread comprises zinc dithiophosphate.

8. The pneumatic tire of claim 1, wherein the rubber composition of the tread comprises a thiuram-based vulcanization accelerator.

9. The pneumatic tire of claim 1, wherein the rubber composition of the tread comprises a tackifying resin.

10. The pneumatic tire of claim 1, wherein the rubber composition of the tread comprises processing aid.

11. The pneumatic tire of claim 1, wherein the rubber composition of the tread comprises silica having a nitrogen adsorption specific surface area ($N_2SA$) of 180 $m^2/g$ or more.

12. The pneumatic tire of claim 4, wherein C/D is 4.5 or higher.

13. The pneumatic tire of claim 1, wherein the rubber composition of the tread has an elongation at break of 225% or more measured under the following test condition, (Test condition)
Tensile rate: 14.0 m/sec
Temperature: 100° C.
Test piece: Dumbbell-shaped No. 7.

14. The pneumatic tire of claim 1, wherein the pneumatic tires is a tire for a passenger car.

\* \* \* \* \*